US012580334B2

(12) United States Patent
Raybold

(10) Patent No.: US 12,580,334 B2
(45) Date of Patent: Mar. 17, 2026

(54) FRONT LOAD CONNECTOR SYSTEM FOR FLAT FLEXIBLE CABLES

(71) Applicant: TE Connectivity Solutions GmbH, Schaffhausen (CH)

(72) Inventor: Christopher Ryan Raybold, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 320 days.

(21) Appl. No.: 18/505,294

(22) Filed: Nov. 9, 2023

(65) Prior Publication Data

US 2025/0158305 A1 May 15, 2025

(51) Int. Cl.
*H01R 12/79* (2011.01)

(52) U.S. Cl.
CPC .................................... *H01R 12/79* (2013.01)

(58) Field of Classification Search
CPC ....... H01R 12/79; H01R 12/77; H01R 12/778
USPC .................................................. 439/492, 499
See application file for complete search history.

(56) References Cited

U.S. PATENT DOCUMENTS

| | | | | |
|---|---|---|---|---|
| 8,382,512 B2 * | 2/2013 | Morita | H01R 12/592 439/910 |
| 2020/0313326 A1 * | 10/2020 | Peterson | H01R 43/02 |
| 2023/0056542 A1 * | 2/2023 | Raybold | H01R 13/6271 |

* cited by examiner

*Primary Examiner* — Gary F Paumen

(57) ABSTRACT

A connector assembly for a flat flexible cable (FFC) comprises a header and a plug receivable within the header. The header includes conductive contacts arranged therein. The plug includes conductive terminals and defines first openings and second openings. The first openings are defined on a first side of the plug and expose a weld pad of each of the terminals for electrically connecting each terminal to an exposed conductor of an FFC. The second openings are defined on a second side of the plug and expose a contact area of each of the terminals for electrically engaging with a respective one of the contacts of the header. The plug is insertable into the header between an initial position wherein the contacts are not in contact with the terminals, and a final position wherein the contacts are engaged with the terminals.

20 Claims, 8 Drawing Sheets

FRONT LOAD CONNECTOR SYSTEM FOR FLAT FLEXIBLE CABLES

FIELD OF THE INVENTION

The present disclosure relates to electrical connectors, and more particularly, to a front load connector assembly or system suitable for use with narrow-pitch flat flexible cables.

BACKGROUND

As understood by those skilled in the art, flat flexible cables or flat flexible circuits (FFCs) are electrical components consisting of at least one conductor (e.g., a metallic foil conductor) embedded within a thin, flexible strip of insulation. Flat flexible cables are gaining popularity across many industries due to advantages provided over their traditional "round wire" counter parts. Specifically, in addition to having a lower profile and lighter weight, FFCs enable the implementation of large circuit pathways with significantly greater ease compared to a round wire-based architectures. As a result, FFCs are being implemented into many complex and/or high-volume applications, including wiring harnesses such as those used in automotive manufacturing. A critical obstacle preventing the implementation of FFCs into these applications includes the need to develop quick, robust, and low resistance termination techniques which enable the relatively fragile FFCs to be mating with various components, including substrates such as printed circuit boards (PCBs). There is also a need for connectors which can be used with relatively narrow-pitch FFCs (e.g., 1.25 mm FFCs), while still being able to withstand vibration, thermal cycling and other mechanical strength requirements in harsh environments (e.g., automotive applications).

Accordingly, improved, reliable solutions for terminating narrow-pitch FFC assemblies are desired.

SUMMARY

In one embodiment of the present disclosure, a connector assembly for a flat flexible cable (FFC) comprises a header and a plug receivable within the header. The header includes conductive contacts arranged therein. The plug includes conductive terminals and defines first openings and second openings. The first openings are defined on a first side of the plug and expose a weld pad of each of the terminals for electrically connecting each terminal to an exposed conductor of an FFC. The second openings are defined on a second side of the plug and expose a contact area of each of the terminals for electrically engaging with a respective one of the contacts of the header. The plug is insertable into the header between an initial position wherein the contacts are not in contact with the terminals, and a final position wherein the contacts are engaged with the terminals.

BRIEF DESCRIPTION OF THE DRAWINGS

The invention will now be described by way of example with reference to the accompanying Figures, of which.

DETAILED DESCRIPTION OF THE EMBODIMENTS

Figure 1:
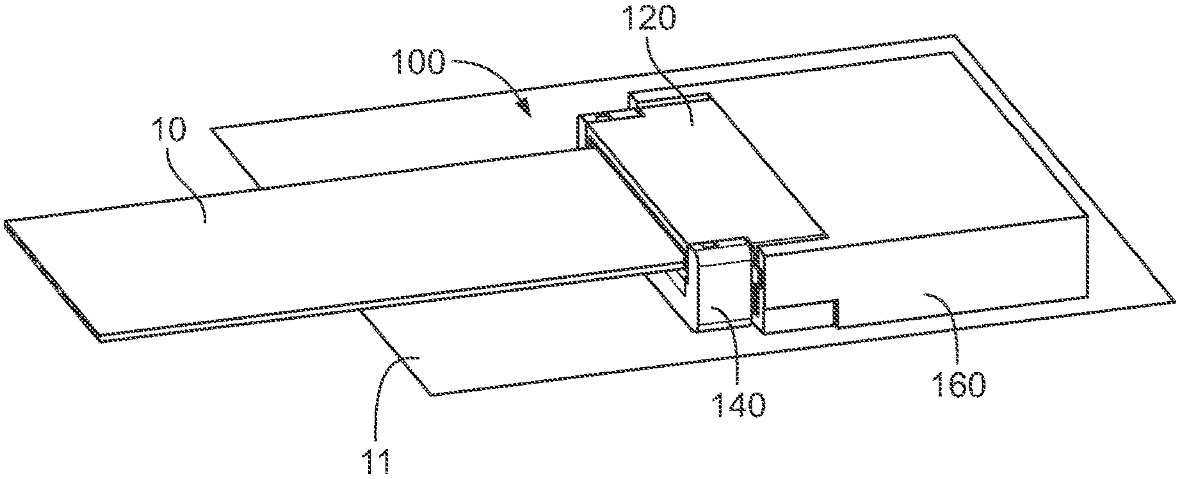
FIG. 1 is side perspective view of an FFC connector assembly according to an embodiment of the present disclosure in a mated state.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
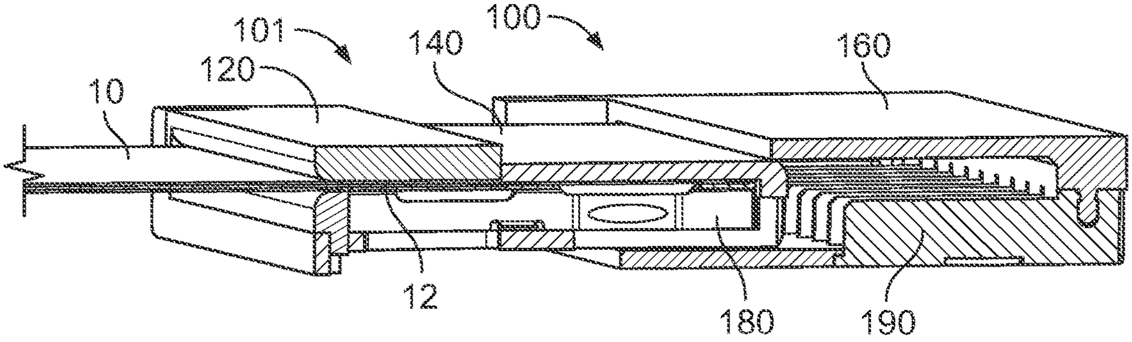
FIG. 2 is a cross-sectional view of the connector assembly of FIG. 1 in an initial alignment state.
Figure 3:
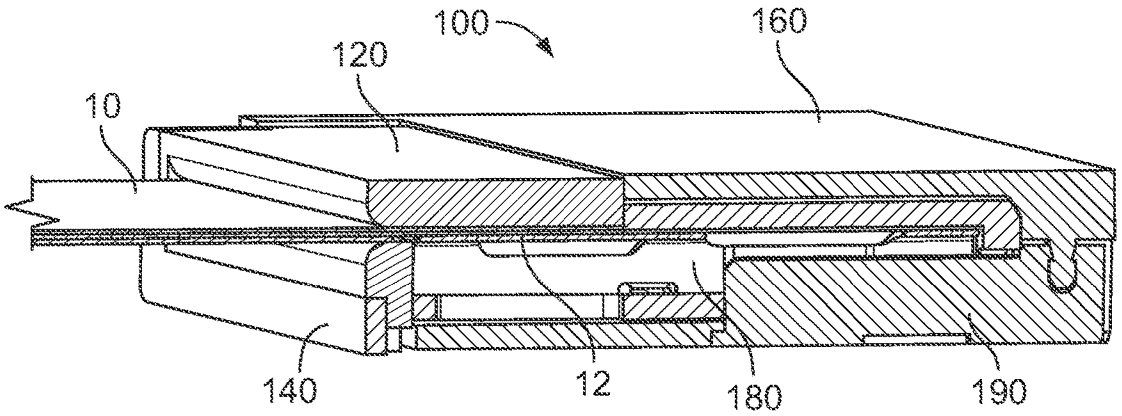
FIG. 3 is a cross-section view of the connector assembly of FIG. 1 in the mated state.

Referring to FIGS. 1-3, an exemplary FFC connector assembly 100 according to an embodiment of the present disclosure is shown. The connector assembly 100 includes a flat flexible cable (FFC) 10, a cable stiffening element or cable stiffener 120, a plug 140 and a header 160. The assembly 100 is adapted to electrically connect the FFC 10 to a substrate 11, such as a printed circuit board (PCB). FIGS. 1 and 3 illustrate the connector assembly 100 in fully mated state wherein a cable assembly 101, including the FFC 10, the stiffening element 120 and the plug 140, is mated to the header 160. In FIG. 2, the assembly 100 is in an initial alignment or partially mated position, wherein the stiffening element 120 and the plug 140 have not been mated to, or electrically engaged with, the header 160. As illustrated, the cable assembly 101 is inserted into a front opening of the header 160. In this way, the assembly 100 comprises a so-called "front load" connector system.

Figure 4:
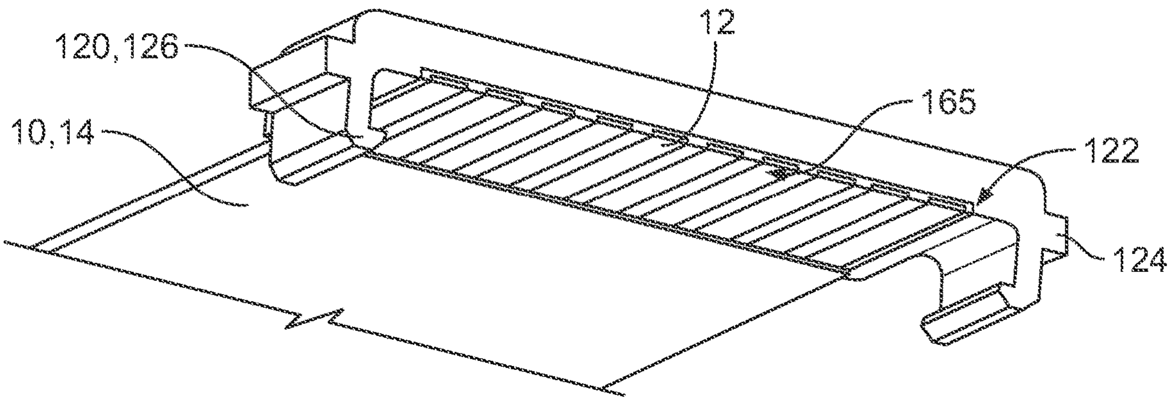
FIG. 4 is a bottom perspective view of a cable subassembly including an FFC and a cable stiffening element installed thereon.
Figure 16:
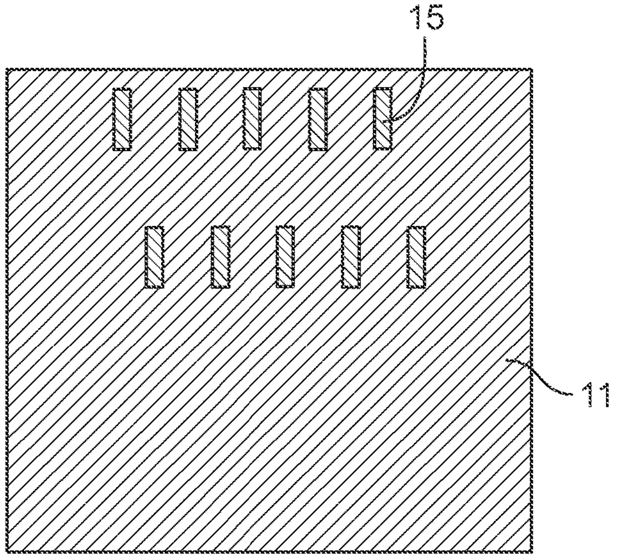
FIG. 16 is a bottom view of a substrate or PCB onto which the header of FIG. 13 is mounted.

As shown in FIG. 2, a plurality of conductive terminals 180 are held within the plug 140, and are electrically connected to a corresponding plurality of conductors 12 of the FFC 10 (see also FIG. 4). In turn, each terminal 180 is connectable to a respective one of a plurality of conductive header tabs or contacts 190 arranged on or within the header 160 as the plug 140 is inserted therein. As will be set forth in greater detail herein, ends of each header tab 190 are exposed through a bottom of the header 160 such that they may be electrically connected to the substrate or PCB 11 (e.g., via soldering or welding to conductive traces or pads formed thereon, see FIG. 16).

Figure 5:
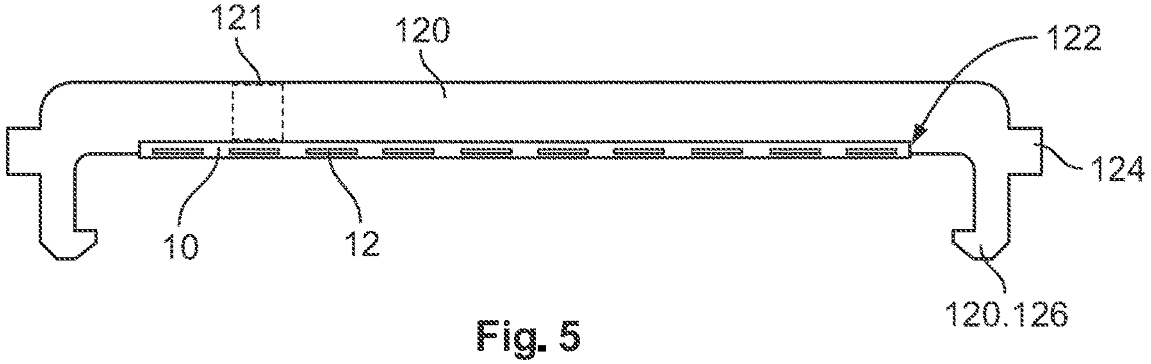
FIG. 5 is a front perspective view of the cable subassembly of FIG. 4.
Figure 17:
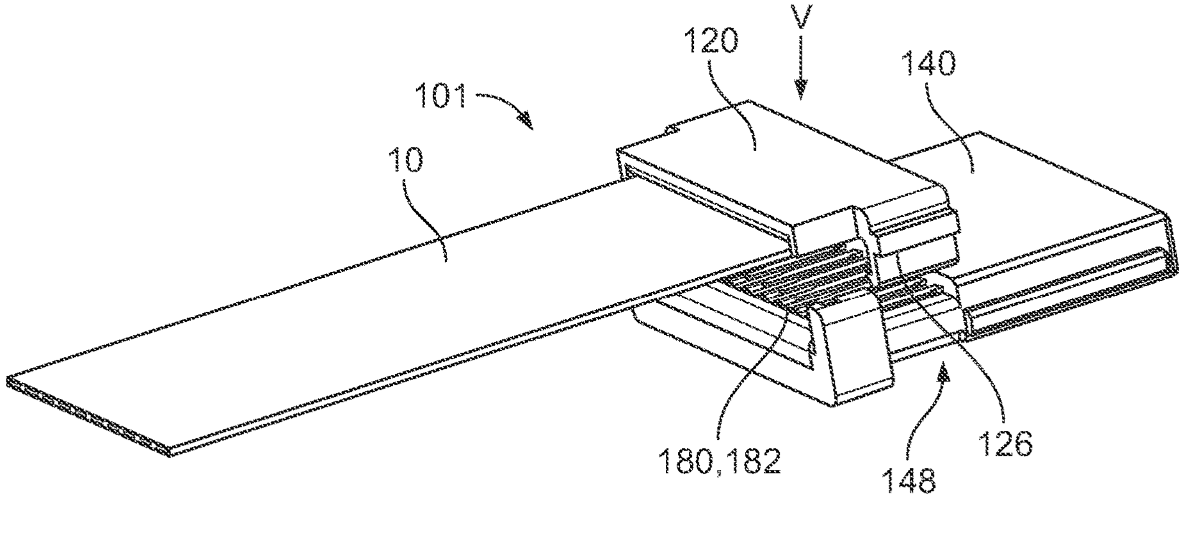
FIG. 17 is a side perspective view of a cable assembly including the cable subassembly of FIG. 4 in an initial mating position with the plug of FIGS. 9-12.

Referring now to FIGS. 4 and 5, the cable stiffener or stiffening element 120 is adapted to structural support the FFC 10 as well as fasten it to the plug 140. The stiffening element 120 defines a slotted opening 122 sized to receive the FFC 10 therethrough, a pair of guide protrusions 124, and a pair of latching arms 126. The guide protrusions 124 and the latching arms 126 are arranged on either lateral side of the stiffening element 120. The guide protrusions 124 are adapted to guide the cable assembly as it is mated with the header 160. The latching arms 126 are adapted to secure or affix the cable stiffening element 120 to the plug 140 as shown in FIG. 17. With reference to FIG. 5, the stiffening element 120 may also include weld windows 121 (one exemplary window illustrated) formed therethrough in order to facilitate welding or soldering of the FFC 10 and the terminals 180 from a top side of the cable assembly 101.

The conductors 12 of the exemplary FFC 10 are embedded within an insulating material 14. The conductors 12 may comprise metallic sheet or foil, such as copper foil, by way of example only, patterned in any desirable configuration. The insulating material 14, such as a polymer insulating material, may be applied to either side of the conductors 12 via an adhesive, resulting in an embedded conductor arrangement. The insulation material 14 may be selectively removed, or not initially applied, in desired areas for exposing the conductors 12, such as in a window 165 defined on an underside of the exemplary illustrated FFC 10. The exposed portion of each of the conductors 12 is then connected (e.g., welded) to a respective terminal 180 held within the plug 140, as set forth in greater detail herein. As shown in FIGS. 1-3, in one embodiment, the FFC 10 and cable stiffening element 120 form a so-called cable end configuration, wherein the FFC 10 is terminated at the assembly 100. In other embodiments, the stiffening element 120, the plug 140 and/or the header 160 may provide a passageway for the FFC 10 (or a second FFC connected thereto) to extend through the assembly 100, wherein it can be routed to additional downstream components.

Figure 6:
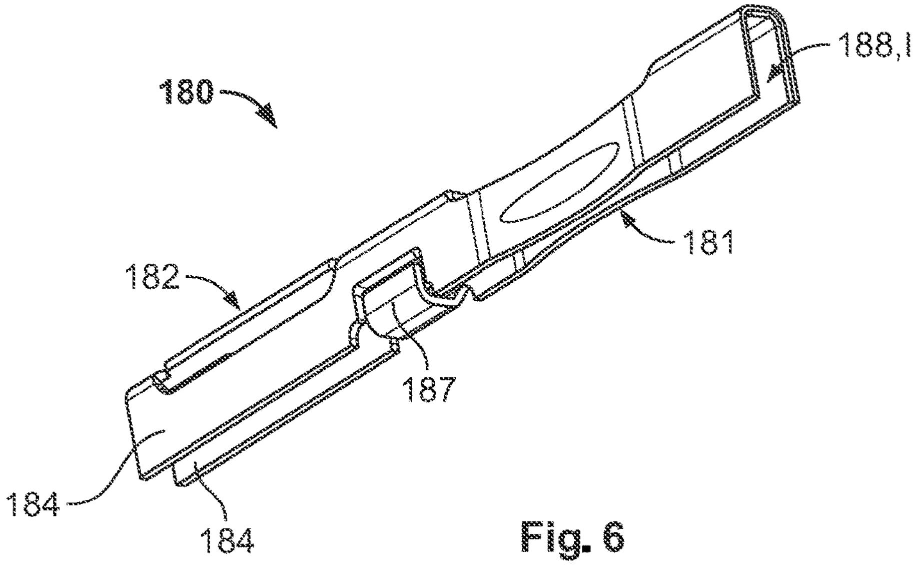
FIG. 6 is a bottom perspective view of a terminal used in the connector assembly of the preceding figures.
Figure 7:
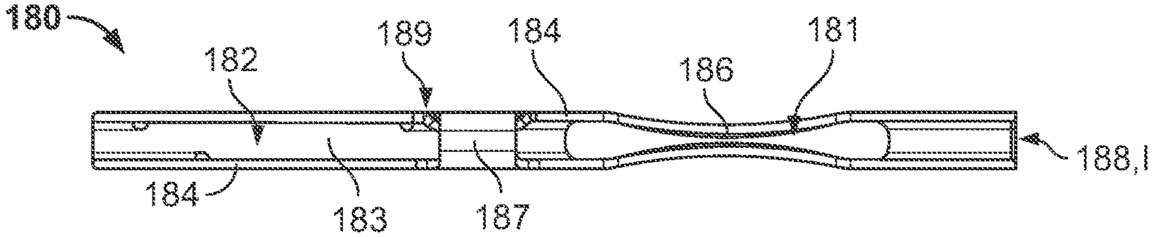
FIG. 7 is a bottom view of the terminal of FIG. 6.
Figure 8:
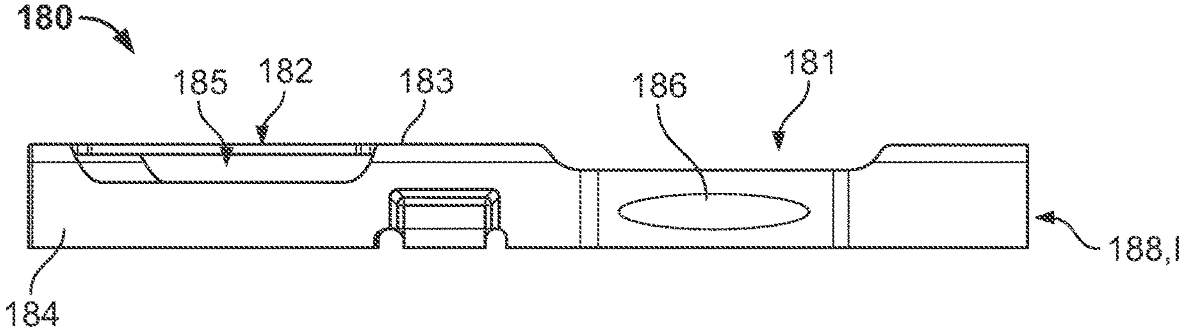
FIG. 8 is a side view of the terminal of FIG. 7.

As shown in FIGS. 6-8, the exemplary terminal 180 according to an embodiment of the present disclosure defines a central slot or slotted opening adapted to receive the header contact 190 slidably therein in an insertion direction I. The opening includes a front end or front opening 188 and a slotted contact area 181 in communication therewith. The terminal 180 further defines a weld area 182 adapted to be electrically connected to the exposed conductor 12 of the FFC 10. More specifically, the terminal 180 comprises a generally inverted U-shaped cross-section including a top wall 183 and two generally parallel side walls 184 extending perpendicularly from the top wall. The weld area 182 comprises a generally planar surface defined on the top wall 183. As shown in FIG. 8, an area directly under the weld area 182 defines a void space 185.

In the exemplary embodiment, one of the side walls 184 defines an integral brace or support 187 extending across the central opening and engaging the other one of the side walls 184. More specifically, the brace 187 may be bent across the slotted opening or contact area 181 defined between the side walls 184 on a bottom side of the terminal 180 opposite the top wall 183. The brace 187 may engage with, or be received by, a corresponding depression 189 formed in the other one of the side walls 184 such that its free end opposes the sidewall 184 in a direction perpendicular to a longitudinal axis of the contact area 181. In this way, the brace 187 is adapted to prevent excess spreading or opening of the slotted contact area 181 as the header contact 190 is inserted therein. This ensures sufficient and consistent electrical contact force between the terminal 180 and the header contact 190.

As can be visualized from the figures, the terminal 180 may be formed by a combination of sheet metal forming operations, such as stamping and bending. Stamping the area ultimately defining the side walls 184 adjacent the weld area 182 is used to effectively widen the weld area. Likewise, stamping the area corresponding to the top wall 183 is used to form the slotted contact area 181. Each of the side walls 184 may be bent or curved inwardly toward a central axis center of the terminal in the contact area 181 in order to assert adequate elastic tension or normal force on an inserted header tab 190. In some embodiments, the side walls 184 define inwardly facing, opposing raised contact protrusions 186 adapted to provide further engagement force on the header tab 190. In any embodiment, the terminal 180 and contact area 181 are adapted to generate sufficient normal force to be used effectively with tin or silver plating on a mating terminal. In still other embodiments, soldering or welding may also be used to connect the terminals 180 to the corresponding FFC conductors 12 without departing from the scope of the present disclosure.

Figure 9:
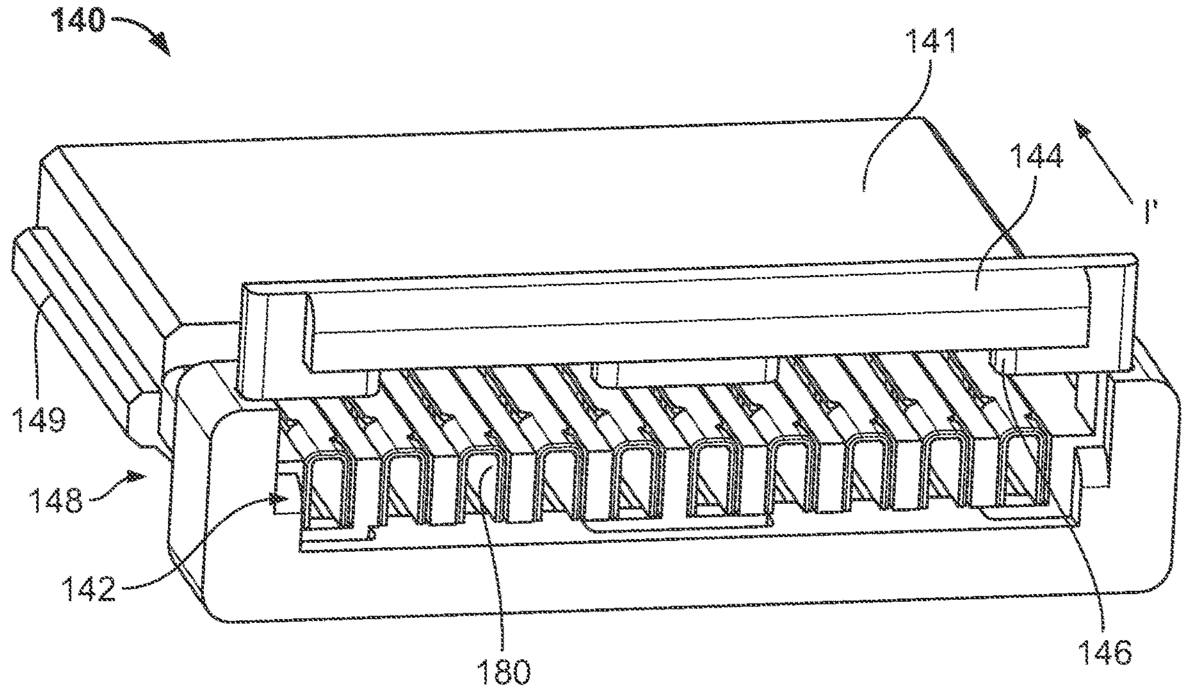
FIG. 9 is a front perspective view of a plug of the connector assembly with a terminal cover thereof in an open position and a plurality of terminals inserted therein.
Figure 10:
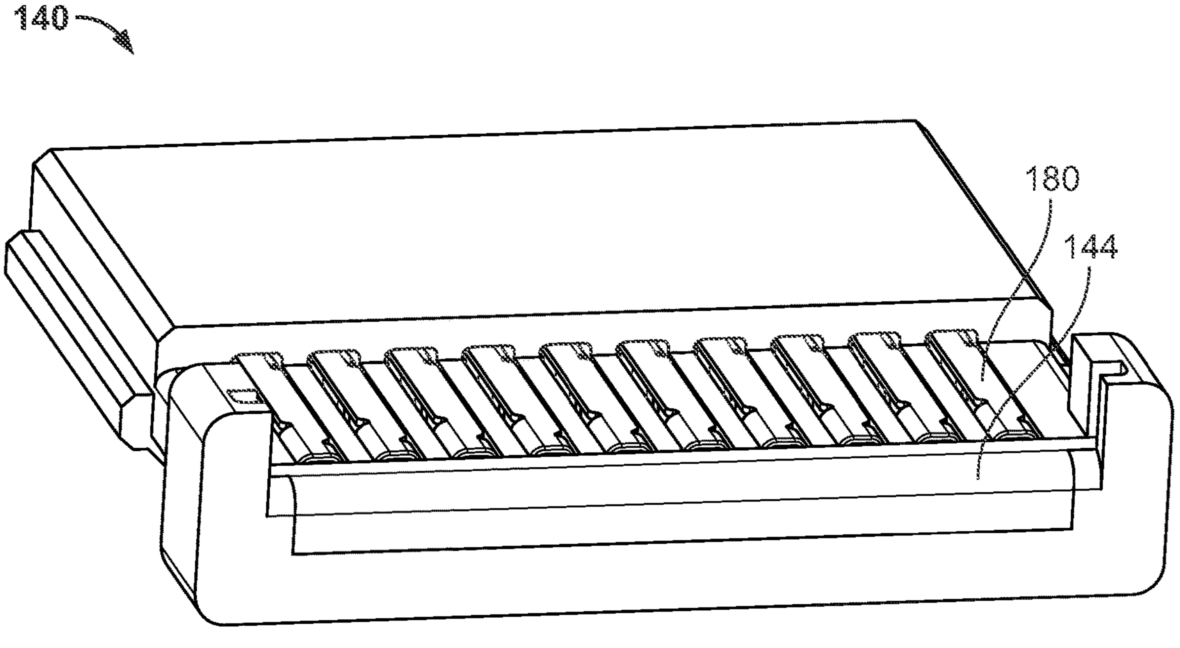
FIG. 10 is a front perspective view of the plug of FIG. 9 with the terminal cover in a closed position.

FIGS. 9-12 illustrate the plug 140 with the terminals 180 inserted therein. Specifically, as shown in FIG. 9, the plug 140 includes a plug body 141 defining a plurality of terminal openings 142. The terminals 180 are inserted into the openings 142 formed in a rear of the plug body 141 in an insertion direction I'. Once the terminals 180 have been inserted, a slidable cover 144 may be translated vertically downward, engaging latching elements 146 thereof with the plug body 141 to secure the cover in a closed position and fixing the terminals within the body, as shown in FIG. 10.

The plug body 141 further defines elongated aligning protrusions or guides 149 formed on each lateral side thereof. The guides 149 are adapted to align the plug 140 relative to the header 160 and guide its insertion therein in the insertion direction I'. The guides 149 also serve to align the plug body 141 and the header 160 in the mated state. The plug body 141 further defines latch recesses 148 formed on each lateral side thereof. The recesses 148 are adapted to receive, and securely engage with, the latching arms 126 of the stiffening element 120 for fixing the stiffening element 120 (and FFC 10) to the plug 140.

Figure 11:
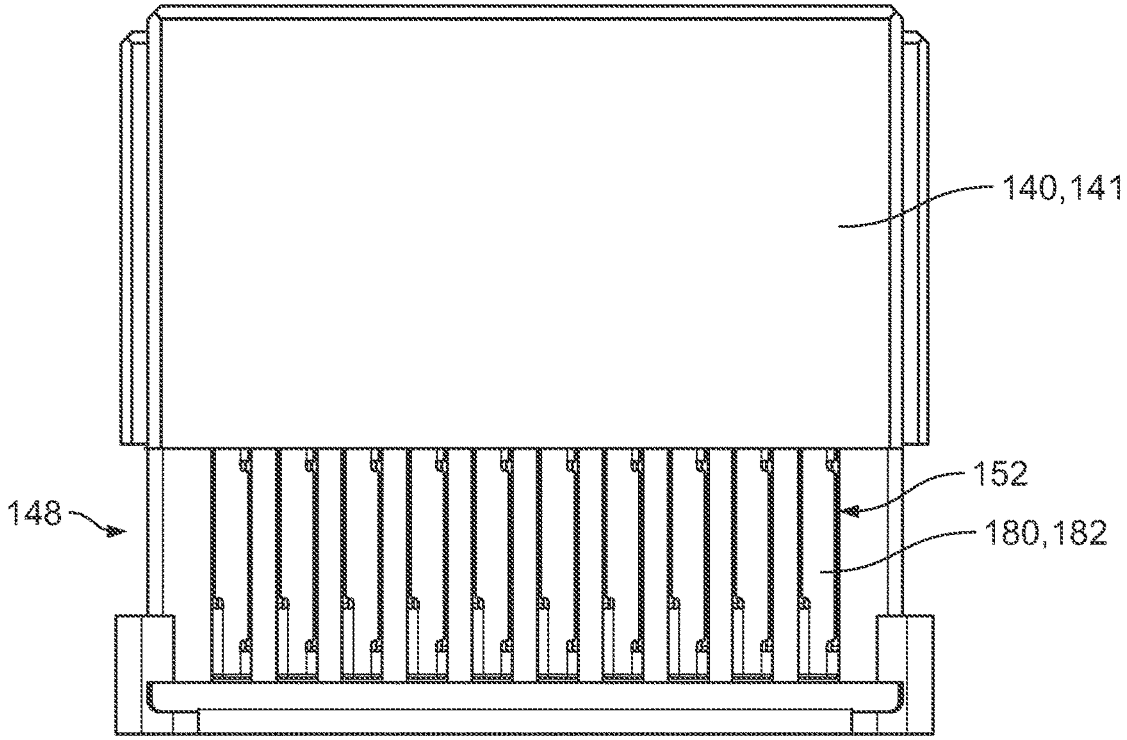
FIG. 11 is a top view of the plug of FIG. 10.
Figure 12:
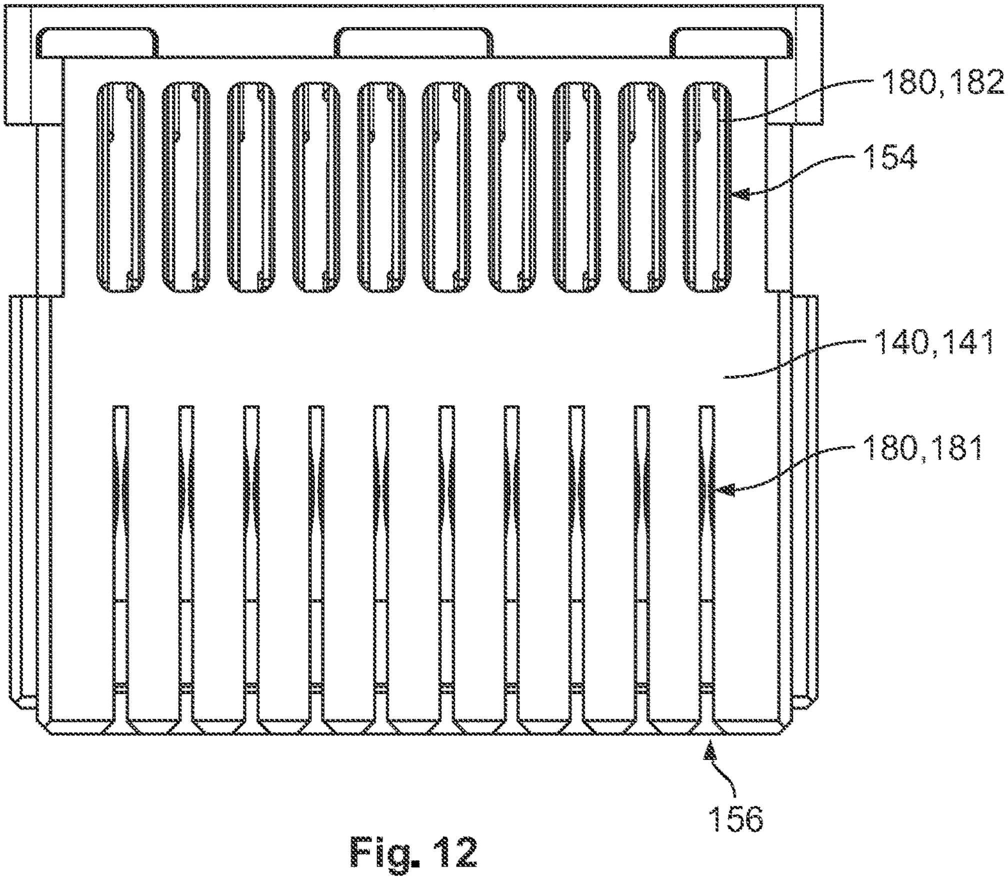
FIG. 12 is a bottom view of the plug of FIG. 10.

A top wall of the plug body 141 shown in FIGS. 10 and 11 defines weld tab openings 152 through which the weld areas 182 of the terminals 180 are exposed on the cable-side of the plug 140. As shown in FIG. 12, a bottom side of the plug 140 defines a plurality of weld windows 154 through which the underside of the weld areas 182 of the terminals 180 are exposed and may be welded to the conductors 12 of the FFC 10. The plug body 141 further includes a plurality of slots 156 formed through a bottom wall thereof and extending in a direction opposite the insertion direction I' from a front end of the plug 140. The slots 156 are adapted (e.g., sized, shaped and located) to slidably receive the header contacts 190 therethrough during mating of the plug 140 and the header 160.

Figure 13:
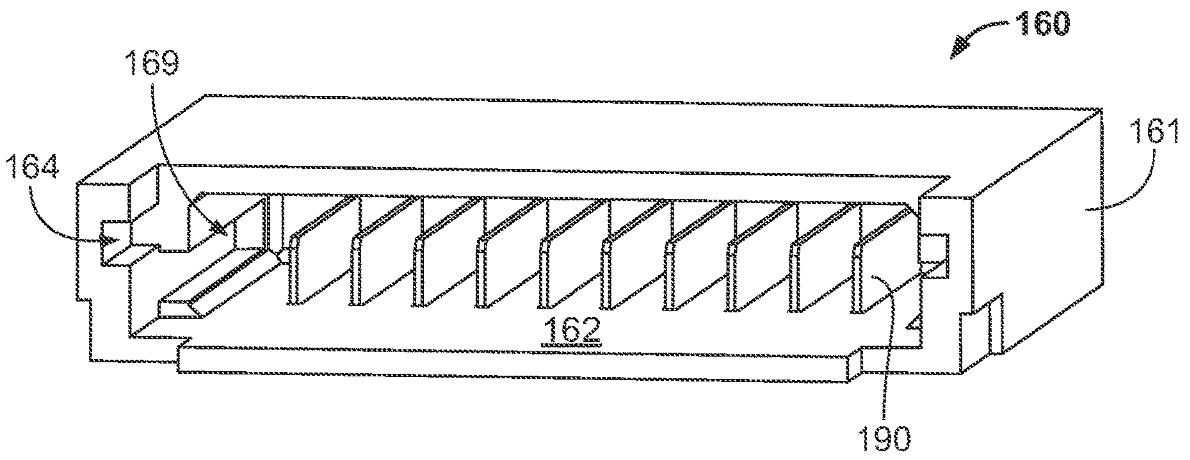
FIG. 13 is a front perspective view of a header of the connector assembly of the preceding figures.

FIG. 13 provides a detailed view of the header 160. The header 160 includes a header body 161 defining a front plug opening in communication with an interior area 162 sized and shaped to receive the plug 140 therein in the insertion direction I. The header body 161 defines a pair of first receiving slots 169 formed in the interior area 162 adapted to receive the guides 149 of the plug 140, as well as a pair of second receiving slots 164 adapted to receive the guide protrusions or guides 124 of the stiffening element 120. These complementary guides and slots of the plug 140 and header 160 are adapted to prevent insertion of the plug into the header in an incorrect orientation (i.e., upside down), in addition to supporting and aligning the plug during mating.

Figure 14:
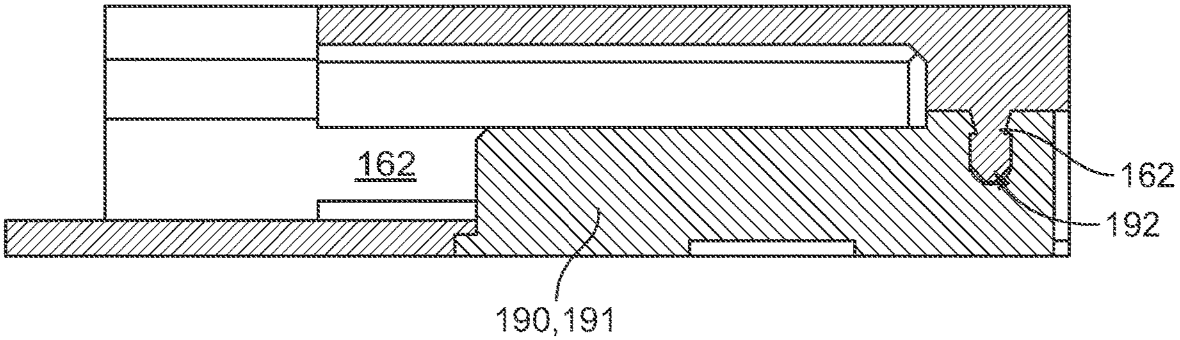
FIG. 14 is a side cross-sectional view of the header of FIG. 13.
Figure 15:
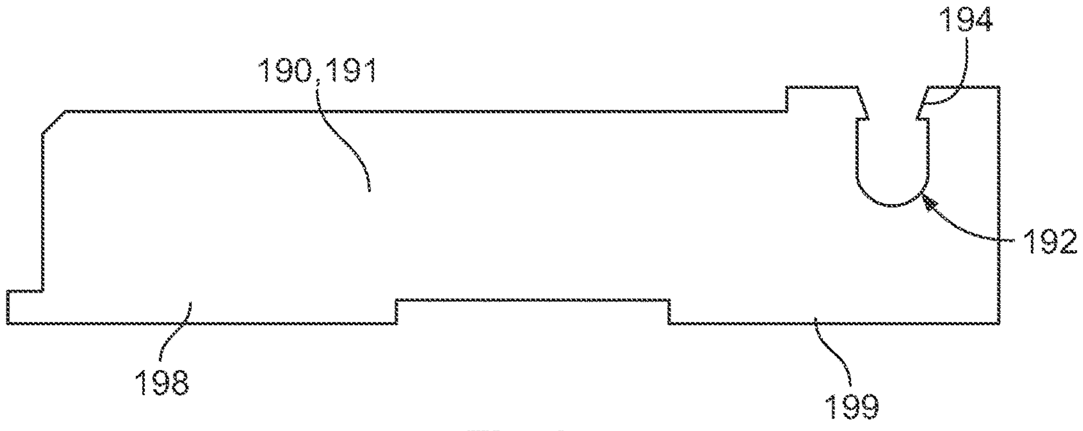
FIG. 15 is a side view of an exemplary header contact of the header of FIG. 13.

Still referring to FIG. 13, as well as to FIGS. 14 and 15, the plurality of header tabs or contacts 190 have a blade-shape and include a mating end 191 adapted to engage with the contact areas 181 of each of the terminals 180, and a plurality of surface mount portions 198,199 adapted to mate with and be electrically connected to, for example, conductors formed on the substrate 11, such as a PCB. As two surface mounting portions 198,199 are provided, each can be utilized simultaneously to improve the connection strength between the substrate 11 and the header contact 190. In the alternative, only one of the surface mounting portions 198,199 may be used for each contact 190. For example, a first contact 190 may utilize the surface mounting portion 198, while the contacts directly adjacent thereto may utilize only the surface mounting portion 199. In this way, the contacts 190 may be attached to substrate 11 in an alternating matter between the surface mounting portions 198,199, as shown in the underside view of the substrate 11 of FIG. 16. As a result of these staggered contact connections to associated solder pads 15 of the substrate 11, improvements in electrical isolation between adjacent conductors 12,180,190 of the plug assembly 100 may be realized.

Each header contact 190 may be secured to the body 161 of the header 160 via engagement of a protrusion 162 of the body 161 with a recess 192 defined in the contact 190. Further, sharpened teeth 194 may be formed on each side of an open end of the recess 192. The teeth 194 are adapted engage with the protrusion 162 for securing the contact 190 to the header 160. As can be visualized from the figures, the header contacts 190 may be inserted into the header body 161 from an underside thereof, or more specifically, by inserting the mating end 191 into an opening formed through a bottom of the header body 161, and translating the contact toward the open front end of the header 160. After the mating end 191 has been sufficiently inserted into the body 161, a rear end of the contact 190 may be raised upwardly to engage the protrusion 162 into the recess 192, thus securing the contact in the illustrated position shown in FIG. 14.

Figure 18:
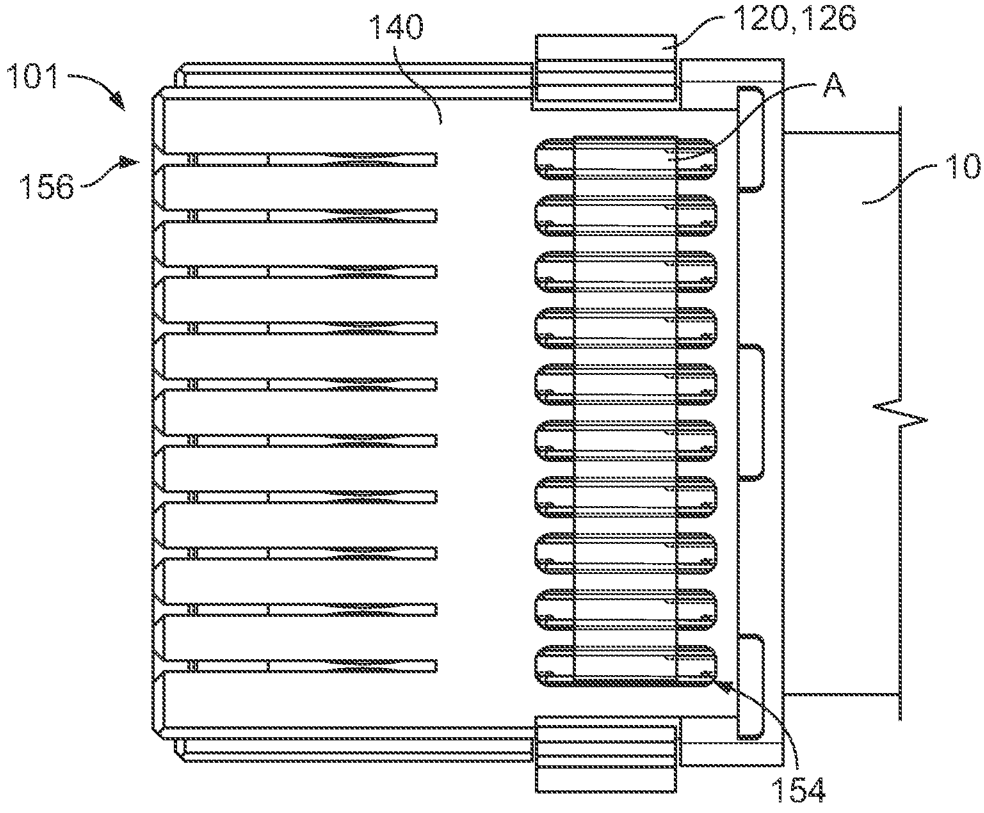
FIG. 18 is a bottom view of the cable assembly of FIG. 17.

Referring now to FIGS. 17 and 18, a process for constructing the cable assembly 101 of the connector assembly 100 is provided. As shown in FIG. 17, with the cable stiffening element 120 fixed to the FFC 10 (e.g., via adhesive), the FFC and stiffening element are fitted to the plug 140. Specifically, from a separated position, biasing the stiffening element 120 in a downward direction V engages the latching arms 126 with the recesses 148 of the plug body 141 in a snap-fit manner. As a result, the exposed conductors 12 of the FFC 10 are positioned opposed to or directly adjacent (e.g., abutting) the weld areas 182 of the terminals 180. As shown in FIG. 18, from the underside of the plug 140, the conductors 12 and terminals 180 are electrically mated through the windows 154, for example, by laser welding. In one embodiment, this target weld area A has a length of at least 3 mm in an axial direction of each terminal 180 and/or conductor 12.

Figure 19:
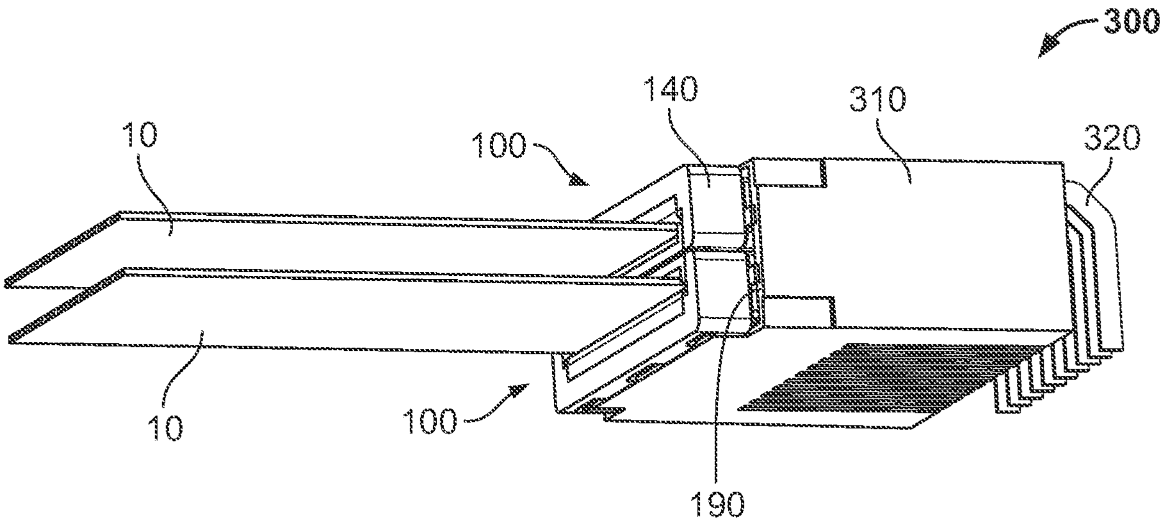
FIG. 19 is a bottom, side perspective view of a connector assembly according to another embodiment of the present disclosure.

FIG. 19 illustrates a connector assembly 300 according to a second embodiment of the present disclosure. Specifically, the connector assembly 300 generally includes two of the above-described connector assemblies 100 arranged over one another and installed within a shared exterior housing 310. Electrical connections between the top connector assembly 100 (away from PCB) and an external element may be made via conductive contacts 320. The electrical connection for the bottom connector assembly 100 (toward PCB) would be made in a similar way as the contact shown in FIG. 15. The contacts 320 extend outwardly and exteriorly from an interior of the housing 310 to electrically connect to the external element, such as a PCB.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector assembly for a flat flexible cable (FFC), comprising:
- a header, including
  - a front plug opening; and
  - a plurality of conductive contacts arranged within the plug opening; and
- a plug insertable in the plug opening in an insertion direction and having a plurality of conductive terminals arranged therein, the plug including:
  - a plurality of first openings defined on a first side of the plug and exposing a weld pad of each of the terminals for electrically connecting each terminal to an exposed conductor of an FFC; and
  - a plurality of second openings defined on a second side of the plug and exposing a contact area of each of the terminals for electrically engaging with a respective one of the plurality of contacts with the plug connected to the header, the plug insertable into the plug opening in the insertion direction between an initial position wherein the plurality of contacts are not in contact with the plurality of terminals, and a final position wherein the plurality of contacts are engaged with the plurality of terminals.

2. The connector assembly of claim 1, wherein each of the plurality of terminals defines a slot extending in an axial direction and adapted to receive one of the plurality of contacts in the insertion direction.

3. The connector assembly of claim 2, wherein the slot defines at least one open side extending in the axial direction, the open side open in a direction normal to the insertion direction.

4. The connector assembly of claim 3, wherein:

each of the plurality of contacts comprises a conductive blade insertable into the slot of one of the plurality of terminals in a direction opposite to the insertion direction of the plug; and with the plug in the initial position, a width of the slot in the contact area is less than a width of the blade.

5. The connector assembly of claim 4, wherein the blade of each of the plurality of contacts engages with the contact area of one of the plurality of terminals as the plug is biased into the final position, the contact area of the terminal applying a contact force on the blade in a direction normal to the insertion direction.

6. The connector assembly of claim 3, wherein each of the terminals comprises:

a top wall having at least one planar section defining the weld pad; and a pair of side walls each extending from opposite sides of the top wall, the top wall and the pair of side walls defining the slot.

7. The connector assembly of claim 6, wherein each of the side walls curves inwardly toward a central axis of the terminal in the contact area, the contact area defined between opposing sides of the side walls.

8. The connector assembly of claim 6, wherein each side wall further defines a contact protrusion extending into the slot, the contact protrusions of each side wall opposing one another in the contact area.

9. The connector assembly of claim 6, wherein one of the side walls of each terminal defines a brace formed integrally therewith, the brace extending over the open side of the slot and engaging with the other one of the side walls.

10. The connector assembly of claim 1, wherein the plurality of contacts are exposed through a bottom wall of the header for electrically connecting to a substrate on which the header is adapted to be mounted.

11. The connector assembly of claim 1, further comprising a cable stiffening element removably attached to a top side of the plug and adapted to fix the FFC on the header and align the exposed conductors of the FFC with the weld pads of the terminals.

12. The connector assembly of claim 1, wherein a side of each of the plurality of terminals opposite the weld pad is accessible through a bottom side of the plug for welding the terminals to the conductors of the FFC.

13. A connector assembly for a flat flexible cable (FFC), comprising:

a plug retaining a plurality of conductive terminals therein, each of the terminals having:

a welding surface exposed on a first side of the plug; and a slotted opening defining opposing contact surfaces;

an FFC including a plurality of conductors exposed on at least one side thereof;

a cable stiffening element arranged over the FFC proximate the plurality of exposed conductors, the cable stiffening element removably fixed to the plug and positioning the exposed conductors of the FFC directly opposite to the welding surfaces of the plurality of terminals; and a header adapted to be mounted to a substrate and defining a front plug opening having a plurality of conductive header contacts arranged therein, the plug connectable to the header through the plug opening in an insertion direction, the plurality of contacts received within the slotted openings of the terminals and conductively contacting the contact surfaces of the plurality of terminals as the plug is moved in the insertion direction relative to the header from an initial position to a final position.

14. The connector assembly of claim 13, wherein the plug includes at least one of a bottom wall or a top wall defining a plurality of parallel slots formed therethrough, each of the slots aligned with one of the slotted openings of a corresponding one of the plurality of terminals and receiving one of the contacts as the plug is connected to the header in the insertion direction.

15. The connector assembly of claim 13, wherein:

each of the plurality of contacts comprises a conductive blade insertable into the slotted opening of one of the plurality of terminals in a direction opposite to the insertion direction of the plug; and with the plug in the initial position, a width of the slotted opening in an area of the opposing contact surfaces is less than a width of the blade.

16. The connector assembly of claim 15, wherein the blade of each of the plurality of contacts engages with the opposing contact surfaces of one of the plurality of terminals as the plug is biased into the final position, the opposing contact surfaces of the terminal applying a contact force on the blade in a direction normal to the insertion direction.

17. The connector assembly of claim 13, wherein each of the terminals comprises:

a top wall having at least one planar section defining the weld pad; and a pair of side walls each extending from opposite sides of the top wall, the top wall and the pair of side walls defining the slotted opening.

18. The connector assembly of claim 17, wherein the side walls define the opposing contact surfaces, each side wall extending inwardly toward a central axis of the terminal.

19. The connector assembly of claim 18, wherein each side wall further defines a contact protrusion extending into the slotted opening from a respective contact surface.

20. The connector assembly of claim 17, wherein the one of the side walls of each terminal defines a brace formed integrally therewith, the brace extending over the slotted opening and engaging with the other one of the side walls.

* * * * *